United States Patent [19]

Takeuchi et al.

[11] Patent Number: 5,079,281

[45] Date of Patent: Jan. 7, 1992

[54] FIBER-REINFORCED POLYPROPYLENE RESIN COMPOSITION

[75] Inventors: Junji Takeuchi, Aichi; Masahiro Takimoto, Mie, both of Japan

[73] Assignee: Toyoda Gosei Co., Ltd., Nishikasugai, Japan

[21] Appl. No.: 442,185

[22] Filed: Nov. 28, 1989

[30] Foreign Application Priority Data

Nov. 30, 1988 [JP]  Japan .................................. 63-303503

[51] Int. Cl.$^5$ ............................................ C08K 9/06
[52] U.S. Cl. ................................... 523/212; 524/420; 524/487; 524/522
[58] Field of Search ................ 523/212; 524/420, 487, 524/522

*Primary Examiner*—Paul R. Michl
*Assistant Examiner*—Edward J. Cain
*Attorney, Agent, or Firm*—Cushman, Darby & Cushman

[57] ABSTRACT

A fiber-reinforced polypropylene resin composition is disclosed, comprising (1) a mixed polymer of polypropylene and carboxyl group containing polypropylene, (2) a silane treated reinforcing fiber, and (3) a coloring component of zinc sulfide and carbon black with a dispersing agent compounded thereto, said dispersing agent is polyethylene wax and the amount of said dispersing agent added to 20 to 50 parts by weight per 100 parts by weight of the zinc sulfide and carbon black.

7 Claims, No Drawings

FIBER-REINFORCED POLYPROPYLENE RESIN COMPOSITION

FIELD OF THE INVENTION

The present invention relates to a fiber-reinforced polypropylene (hereinafter referred to as "FRPP") resin composition for use in production of gray colored moldings. These moldings include wheel caps for cars, main covers for electric appliances such as air conditioners, and cases for typewriters.

BACKGROUND OF THE INVENTION

In the case of a wheel cap of a car, for example, from a viewpoint of a reduction in weight and so forth, a plastic wheel cap is now on the market in place of the conventional metallic wheel. As resins for production of such plastic wheel caps, modified polyphenylene oxide (modified PPO) and polyamide (PA) are mainly used.

These resins, however, are expensive and it is thus desirable to replace them with other resins. Further, there is a demand to reduce the weight of the wheel cap.

The present inventors made extensive investigation of polypropylene (PP) capable of meeting the above requirements. More particularly, they made a study of a fiber reinforced resin, i.e., a FRPP resin composition, because PP alone is not sufficiently strong (such as with regard to stiffness and impact resistance).

In view of adhesion properties between PP polymer and reinforcing fibers, a mixed polymer of PP and a carboxyl group-containing PP (hereinafter referred to as "modified PP") was used as the polymer, and silane treated fibers were used as the reinforcing fibers.

In order to produce a gray colored wheel cap, a coloring component comprising two component pigments of zinc sulfide and carbon black with a general dispersing agent (higher fatty acid metal salt) added thereto was compounded to the above FRPP resin composition to prepare a molding material.

It has been discovered, however, that by injection molding of the above molding material (FRPP resin composition) is difficult to obtain a molding having sufficient strength (both stiffness and impact resistance) to be used as a wheel cap (see Comparative Example 1).

SUMMARY OF THE INVENTION

An object of the present invention is to provide a FRPP resin composition capable of providing a gray colored molding having sufficiently high stiffness and impact resistance.

It has been found that the object can be attained by the following composition.

The present invention relates to a fiber-reinforced polypropylene resin composition comprising (1) a mixed polymer of polypropylene and a carboxyl group containing polypropylene, (2) a silane treated reinforcing fiber, and (3) a coloring component of zinc sulfide and carbon black with a dispersing agent compounded thereto, wherein said dispersing agent is polyethylene wax and the amount of said dispersing agent added is 20 to 50 parts by weight per 100 parts by weight of the zinc sulfide and carbon black.

DETAILED DESCRIPTION OF THE INVENTION

The present invention will hereinafter be explained in detail. "Part", "%" and "ratio" are by weight unless otherwise indicated.

(1) The polymer which is used in the present invention is a mixed polymer of PP and modified PP. The PP is crystalline, and the modified PP content is generally 5 to 20% based on the fiber-reinforced polypropylene resin composition. If the content is less than 5%, the effect of improved adhesion to the reinforcing fibers cannot be obtained. On the other hand, if the modified PP content is more than 20%, no further improvement in adhesion can be expected, which is undesirable from an economic standpoint. The carboxyl group of the modified PP is introduced into the PP chain by reacting maleic anhydride, for example, by the usual method (usually a graft polymerization method).

(2) A reinforcing fiber is compounded to the polymer. As such reinforcing fibers, glass fibers, carbon fibers, and the like can be used. Preferably glass fibers are used. The amount of the reinforcing fiber added is usually 10 to 50 parts per 100 parts of the polymer. As the reinforcing fibers, those subjected to silane treatment according to the usual method are used. As a silane coupling agent for use in silane treatment, methacryloxypropyltrimethoxysilane, vinyltrichlorosilane, vinyltriethoxysilane, N-$\beta$-(aminoethyl)-$\gamma$-aminopropyltrimethoxysilane, vinyltris($\beta$-methoxyethoxy)-silane and the like are preferably used.

(3) As a coloring component, a gray coloring component comprising two component pigments of zinc sulfide and carbon black with a dispersing agent added thereto is used. The amount of the coloring component added is usually 0.5 to 2 parts per 100 parts of the polymer. The compounding ratio of zinc sulfide to carbon black (zinc sulfide/carbon black) is generally 95/5 to 80/20, although it varies depending on the color tone needed.

The above procedure is a preceding construction to which the prior technique can be applied.

In the above preceding construction, the present invention is characterized in that the dispersing agent is polyethylene wax (hereinafter referred to as "PE wax") and the amount of the dispersing agent added is 20 to 50 parts per 100 parts of the two component pigment.

If the amount of the PE wax added is less than 20 parts, the pigment will not disperse, resulting in uneven coloring of the resin composition. On the other hand, if it is more than 50 parts, coloring force drops and strength tends to drop.

The FRPP resin composition having the above construction is, after addition of additives such as a stabilizer (e.g., a thermal stabilizer, an ultraviolet absorber, a light stabilizer), a releasing agent, and a plasticizer if desired, kneaded and granulated by the use of a granulator to produce a molding material.

This molding material is molded into a wheel cap, covers, or cases as described above by injection molding, for example.

The FRPP resin composition of the present invention contains a mixed polymer of PP and carboxy group-containing PP. The reinforcing fiber is a fiber subjected to silane treatment, and the coloring component is for gray coloring and comprises a two component pigment of zinc sulfide and carbon black with a dispersing agent compounded thereto. The dispersing agent is PE wax and the amount of the PE wax added is 20 to 50 parts per 100 parts of the two component pigment. The FRPP resin composition of this invention exhibits the following actions and effects.

As shown in the examples as described hereinafter, a molding obtained using an FRPP resin composition satisfying the requirements of the present invention, i.e., containing PE wax as the dispersing agent, is markedly great in mechanical properties (e.g., tensile strength, flexural strength, impact strength) as compared with those in which the dispersing agent is a fatty acid metal salt (e.g., magnesium stearate).

Accordingly, the FRPP resin composition of the present invention can provide a molding which is colored gray and has sufficiently high stiffness and impact resistance.

The reason why the molding has sufficiently high mechanical properties is not clear, but it is assumed to be as follows.

When a fatty acid metal salt is used as the dispersing agent of the coloring component, the fatty acid metal salt reacts with the carboxyl group in the modified PP, reducing the effect of the modified PP (i.e., increase of adhesive properties to reinforcing fibers), and because of poor adhesion between the polymer and reinforcing fiber, satisfactory mechanical properties are difficult to obtain. On the contrary, in the present invention, since PE wax is used as the dispersing agent, the above problem do not occur, that is, adhesion between the polymer and the reinforcing fiber is improved and excellent mechanical properties can be obtained.

The present invention is described in greater detail with reference to the following examples.

A mixture of the compositions of each of the Examples and Comparative Examples shown in Table 1 was mixed in a tumbler, kneaded and extruded through a same direction biaxial screw extruder (glass fiber side feed system), and then granulated to obtain an injection molding material.

| Composition | |
| --- | --- |
| Polymer *1 | 100 parts |
| Glass Fiber | 44 parts |
| Heat Stabilizer | 0.1 part |
| Light Stabilizer | 0.2 part |
| Ultraviolet Absorber | 0.1 part |

| Composition | |
| --- | --- |
| -continued | |
| Coloring Component | 0.7 part |

*1 PP/Modified PP = 100/15

Each molding material was molded under injection conditions of a molding temperature of 220° C. and an injection pressure of 50 kgf/cm$^2$ to produce a test piece. This test piece was measured for physical properties (e.g., mechanical properties) shown in Table 1. The appearance was determined by examining "formation of unevenness in color" with the eye.

The testing results are shown in Table 1. It is clearly seen that the Examples according to the present invention have excellent physical properties and appearance as compared with the Comparative Examples.

TABLE 1

|  | Example | | Comparative Example | | |
| --- | --- | --- | --- | --- | --- |
|  | 1 | 2 | 1 | 2 | 3 |
| Coloring Component | | | | | |
| Zinc sulfide | 86 | 86 | 86 | 86 | 86 |
| Carbon Black | 14 | 14 | 14 | 14 | 14 |
| PE Wax*1 | 20 | 50 | — | 10 | 70 |
| Magnesium Stearate | — | — | 20 | — | — |
| Tensile Strength (kgf/cm$^2$) (based on ASTM D-638) | 756 | 732 | 346 | 706 | 680 |
| Flexural Strength (kgf/cm$^2$) (based on ASTM D-790) | 1060 | 1073 | 520 | 1040 | 990 |
| Modulus in Flexure (kgf/cm$^2$) (based on ASTM D-790) | 51120 | 50200 | 33800 | 51000 | 50900 |
| Heat Distorsion Temperature (°C.) (based on ASTM D-638) | 145 | 146 | 117 | 145 | 142 |
| Izod Impact Strength at 23° C. (kgf cm/cm) (based on ASTM D-256) | 20.1 | 20.6 | 7.3 | 20.1 | 19.1 |
| Izod Impact Strength at −30° C. (kgf cm/cm) (based on ASTM D-256) | 11.5 | 10.8 | 3.0 | 11.0 | 9.1 |
| Appearance (formation of Unevenness in Color) | Not prominent | Not prominent | Not prominent | prominent | Slightly prominent |

*1Hiwax 220 (produced by Mitsui Petrochemical Industry Co., Ltd.)

In Comparative Example 1 in which the commonly used higher fatty acid metal salt (i.e., magnesium stearate) is used as the dispersing agent, strength is markedly poor as compared with the Examples of the present invention. In Comparative Example 2, in which PE wax is used as the dispersing agent, the amount of the PE wax used is too small, the appearance is bad and the strength is slightly inferior to that of the Examples according to the present invention. On the other, in Comparative Example 3 in which the amount of PE wax compounded is too large, the strength tends to decrease and the appearance is not sufficiently satisfied.

While the invention has been described in detail and with reference to specific embodiments thereof, it will be apparent to one skilled in the art that various changes and modifications can be made therein without departing from the spirit and scope thereof.

What is claimed is:

1. A fiber-reinforced polypropylene resin composition comprising (1) a mixed polymer of polypropylene and carboxyl group-containing polypropylene, said carboxyl group-containing polypropylene being from 5 to 20% by weight based on the total weight of said resin composition, (2) a silane treated reinforcing fiber, and (3) a coloring component of zinc sulfide and carbon black with a dispersing agent compounded thereto, said dispersing agent comprising polyethylene wax in an amount of 20 to 50 parts by weight polyethylene wax per 100 parts by weight of the zinc sulfide and carbon black.

2. The fiber-reinforced polypropylene resin composition according to claim 1, wherein the amount of the reinforcing fiber is 10 to 50 parts by weight per 100 parts by weight of the mixed polymer.

3. The fiber-reinforced polypropylene resin composition according to claim 1, wherein the amount of the coloring component is 0.5 to 2 parts by weight per 100 parts by weight of the mixed polymer.

4. The fiber-reinforced polypropylene resin composition according to claim 1, wherein the weight ratio of said zinc sulfide to carbon black is 95/5 to 80/20.

5. The fiber-reinforced polypropylene resin composition according to claim 1, wherein the reinforcing fiber is selected from the group consisting of glass and carbon fibers.

6. The fiber-reinforced polypropylene resin composition according to claim 1, further comprising a member of the group consisting of a stabilizer, a releasing agent, and a plasticizer.

7. A gray-colored molding material comprising the fiber-reinforced polypropylene resin of claim 6.